United States Patent
Messick, Jr. et al.

(10) Patent No.: US 7,975,840 B2
(45) Date of Patent: Jul. 12, 2011

(54) FLAT WIRE CONVEYOR BELT SYSTEM

(75) Inventors: George H. Messick, Jr., E. New Market, MD (US); Robert E. Maine, Jr., Salisbury, MD (US)

(73) Assignee: Cambridge International, Inc., Cambridge, MD (US)

( * ) Notice: Subject to any disclaimer, the term of this patent is extended or adjusted under 35 U.S.C. 154(b) by 178 days.

(21) Appl. No.: 12/235,233

(22) Filed: Sep. 22, 2008

(65) Prior Publication Data

US 2009/0078544 A1     Mar. 26, 2009

Related U.S. Application Data

(60) Provisional application No. 60/960,243, filed on Sep. 21, 2007.

(51) Int. Cl.
*B65G 17/06* (2006.01)
(52) U.S. Cl. .................. 198/848; 198/834; 198/850
(58) Field of Classification Search .................. 198/834, 198/848, 850–853
See application file for complete search history.

(56) References Cited

U.S. PATENT DOCUMENTS

| | | | |
|---|---|---|---|
| 4,222,483 A * | 9/1980 | Wootton et al. ............... | 198/831 |
| 4,253,344 A | 3/1981 | Kerklies | |
| 4,754,871 A * | 7/1988 | Gustafson ..................... | 198/848 |
| 5,141,099 A | 8/1992 | Baumgartner | |
| 5,271,491 A | 12/1993 | Irwin | |
| 5,404,998 A * | 4/1995 | Frye .............................. | 198/848 |
| 5,950,807 A | 9/1999 | Greer | |
| 6,202,833 B1 * | 3/2001 | Greer ............................ | 198/851 |
| 6,615,978 B1 * | 9/2003 | Farrell ......................... | 198/848 |
| 6,758,776 B2 * | 7/2004 | Fye et al. ........................ | 474/95 |
| 6,766,899 B1 | 7/2004 | Guldenfels | |
| 7,494,005 B2 * | 2/2009 | Messick et al. ............... | 198/848 |
| 2003/0089583 A1 | 5/2003 | Depaso et al. | |
| 2003/0144098 A1 | 7/2003 | Fye et al. | |
| 2007/0080048 A1 | 4/2007 | Messick, Jr. et al. | |

OTHER PUBLICATIONS

International Search Report dated Dec. 2, 2008 in corresponding PCT/US2008/010983.

* cited by examiner

*Primary Examiner* — Douglas A Hess
(74) *Attorney, Agent, or Firm* — Bunchanan Ingersoll & Rooney PC

(57) ABSTRACT

A flat wire conveyor belt system includes a plurality of spaced tractive rods and a plurality of rows of pickets transversely disposed with respect to a direction of travel and interconnecting the plurality of spaced tractive rods, each of the rows of pickets including a plurality of first links and a plurality of second links, the plurality of first links have a first spacing and the plurality of second links have a second spacing, the first spacing being less than the second spacing. The system further includes a sprocket, wherein the plurality of first links are configured to engage the sprocket teeth thereof.

12 Claims, 6 Drawing Sheets

FLAT WIRE CONVEYOR BELT SYSTEM

CROSS-REFERENCE TO RELATED APPLICATION

This application claims priority under 35 U.S.C. §119(e) to U.S. Provisional Application Ser. No. 60/960,243 filed Sep. 21, 2007.

FIELD OF THE INVENTION

The present invention is directed to a conveyor belt, more particularly to a flat wire conveyor belt having variable spaced wire links, and still more particularly, to a flat wire conveyor belt system having variable spaced wire links that are designed to be engaged by dual tooth sprockets.

BACKGROUND OF THE INVENTION

Flat wire conveyor belts have been in the market for many years. Flat wire conveyor belts are generally low maintenance and when positively driven with sprockets have little to no lateral shifting. With reference to FIG. 1, U.S. Pat. No. 2,619,306 discloses a flat wire conveyor belt 10 comprising a plurality of pickets 16, sometimes also referred to as wickets, and interconnecting rods 18 about which the pickets hinge. The pickets 16 on belt 10 support the product to be conveyed and the rods 18 are utilized to hold the components of belt 10 together.

In a straight run, when a sprocket tooth is disposed within an opening defined by a link in the picket, the sprocket tooth relieves the tension in the adjacent pickets and concentrates it one location, thereby causing rod 18 to deflect at the sprocket tooth. This in turn causes the link in the picket which surrounds the sprocket tooth to become more highly loaded. Hence, fatigue and breakage may occur at one or more of the link areas surrounding a sprocket tooth where rod 18 meets picket 16.

Fatigue breakage at one or more of the picket areas of a flat wire conveyor belt is a function of the number of cycles that a particular area is flexed. This problem becomes even more pronounced as the conveyor belt becomes lighter in weight and more open.

U.S. Pat. No. 5,950,807 is a light duty conveyor belt constructed from round wire elements that only partially hinge and thereby flex due to interferences between the wire elements. The '807 patent attempts to increase load carrying ability of the conveyor belt without increasing weight by using alternating small and large openings in the belt. While this may marginally improve the strength of the belt, the belt still experiences rapid failure because of the inability of the wire elements to truly binge freely, and the belt still has a tendency to deflect when driven by sprockets which imparts fatigue loading to the wire elements, resulting in wire breakage.

Accordingly, there exists a need in the marketplace for a flat wire conveyor belt having a lighter weight and reduced quantity of required material; thus reducing the cost, while still retaining its strength so as to avoid fatigue failure.

SUMMARY OF THE INVENTION

These and other objects are met by a variable spaced conveyor belt system including a plurality of spaced tractive rods and a plurality of rows of pickets transversely disposed with respect to a direction of travel and interconnecting the plurality of spaced tractive rods. Each of the rows of pickets includes a plurality of first links and a plurality of second links, the plurality of first links having a first spacing and the plurality of second links having a second spacing. The system further includes a sprocket, wherein the plurality of first links are configured to engage the sprocket teeth thereof.

BRIEF DESCRIPTION OF THE DRAWING FIGURES

These and other objects, features, and advantages of the present invention will become more readily apparent to those skilled in the art upon reading the following detailed description, in conjunction with the appended drawings in which.

DETAILED DESCRIPTION OF THE PREFERRED EMBODIMENTS

Figure 1:
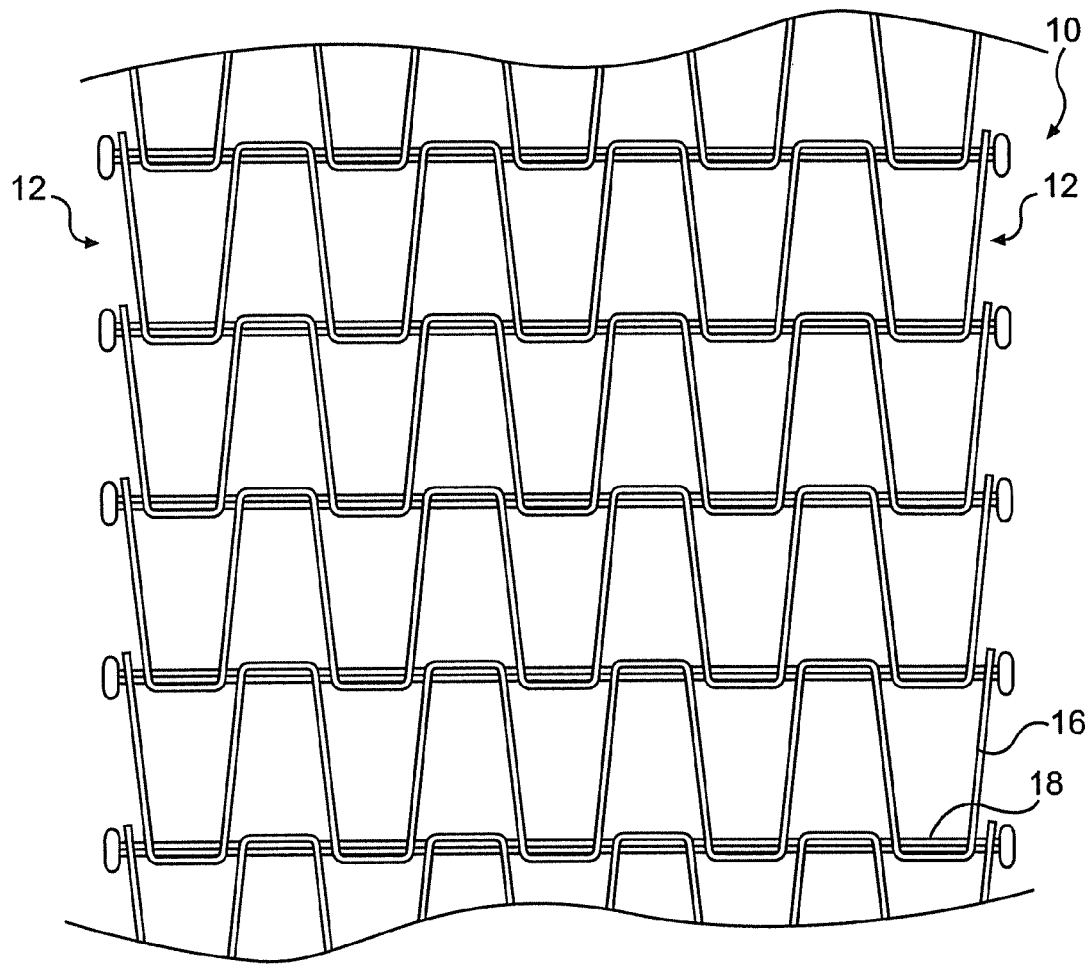
FIG. 1 is a top elevational view of a segment of a conventional flat-wire conveyor belt.
Figure 2:
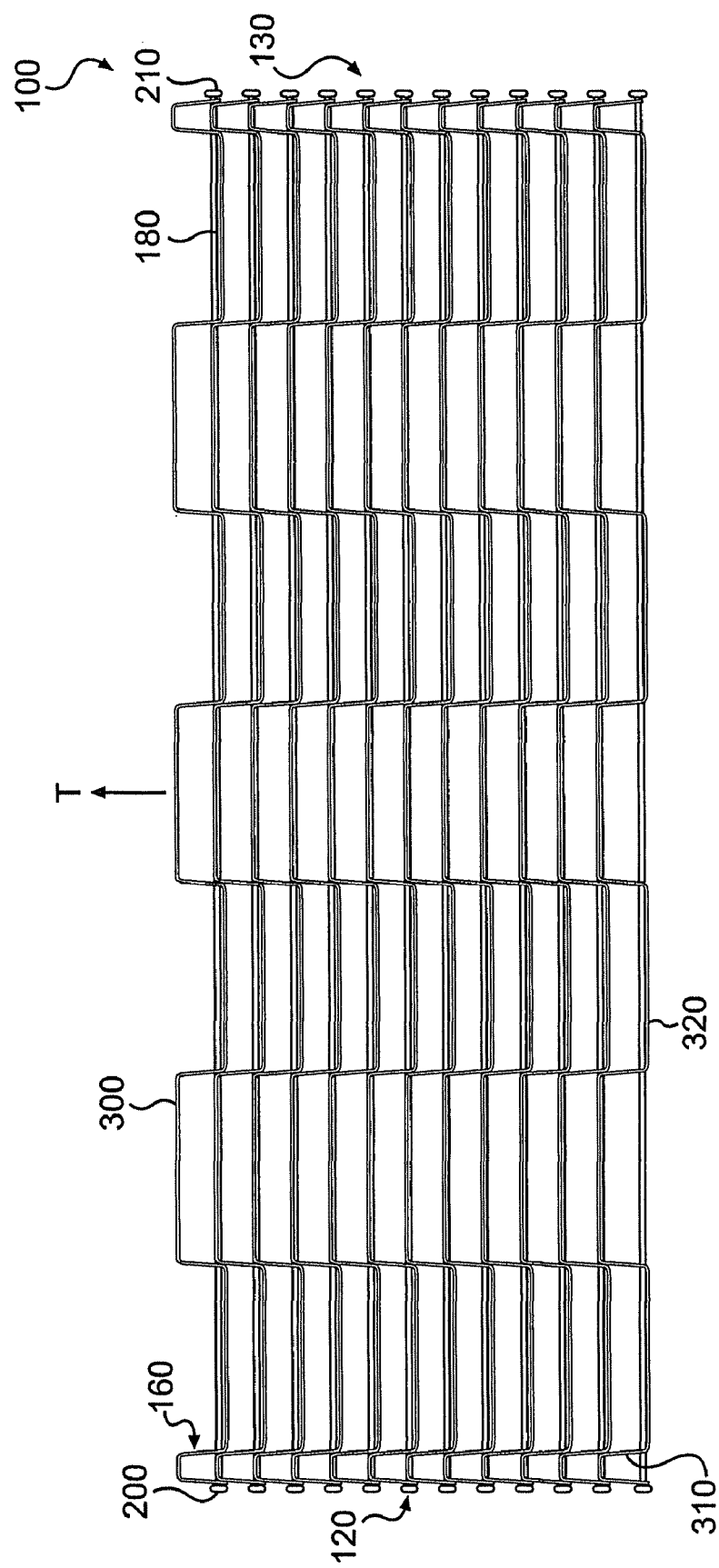
FIG. 2 is a top elevational view of a flat-wire conveyor belt according to a preferred embodiment of the present invention.

A conveyor belt in accordance with the present invention is shown generally in FIG. 2 by reference numeral 100. Conveyor belt 100 preferably comprises a flat wire conveyor belt including a plurality of spaced tractive rods 180 disposed in succession and transversely with respect to a direction of travel T as represented by arrow T of belt 100, each rod 180 having two ends 200 and 210.

Belt 100 includes a plurality of rows of pickets 160 transversely disposed with respect to the direction of travel T, and interconnecting the succession of rods 180. Each row of pickets 160 is comprised of a plurality of links 300, each link connecting a rod 180 with a following rod in the succession.

In accordance with a first preferred embodiment of the present invention, pickets 160 comprise a plurality of links 300; however, not all the links 300 within a single picket are identical. More particularly, in order to strengthen the outer edges of the conveyor belt, the edges 120, 130 of the picket are provided with links 310 having a first spacing or mesh size and the middle portion of the belt therebetween is provided with links 320 having a second spacing or mesh size. The exact number of links 310 or mesh openings on each end of the picket may vary depending upon the weight of the belt and other conditions. By way of example, picket 160 shown in FIG. 2 includes link 310 defining one open mesh area on each end of the picket whereas pickets 160' and 160" shown in FIGS. 3 and 4, respectively, include two links 310 defining four open mesh areas on each end thereof for cooperation with a dual tooth sprocket, as discussed further below.

In a preferred embodiment, the spacing of the links 310 is less than the spacing of the links 320 such that the edges of the conveyor belt are reinforced by being more dense, heavier, and stronger. As shown in FIG. 2, links 310 are formed, preferably, having a conventional 1×1 spacing, that is, the mesh opening defined by the links 310 is 1" in the lateral direction and 1" in the longitudinal direction, On the other hand, links 320 are spaced further apart in a 3×1, 4×1, or similar pattern, that is, the opening defined by the links 320 is 3" or 4" in the lateral direction and 1" in the longitudinal direction. By spacing the links in the middle portion further apart, the weight of the picket is reduced and thus, the overall weight and material need for the conveyor belt are reduced. One skilled in the art will recognize that 3×1 and 4×1 are merely examples of link spacing and other spacing patterns could be used to even further reduce the weight of the belt. Similarly, while the 1×1 pattern is illustrated for links 310, a conventional ½×1 pattern could also be used depending upon the fatigue conditions, or still further, any mesh opening between the ½×1 and the 1×1 could be used depending upon the intended dimensions of the sprocket teeth.

Figure 3:
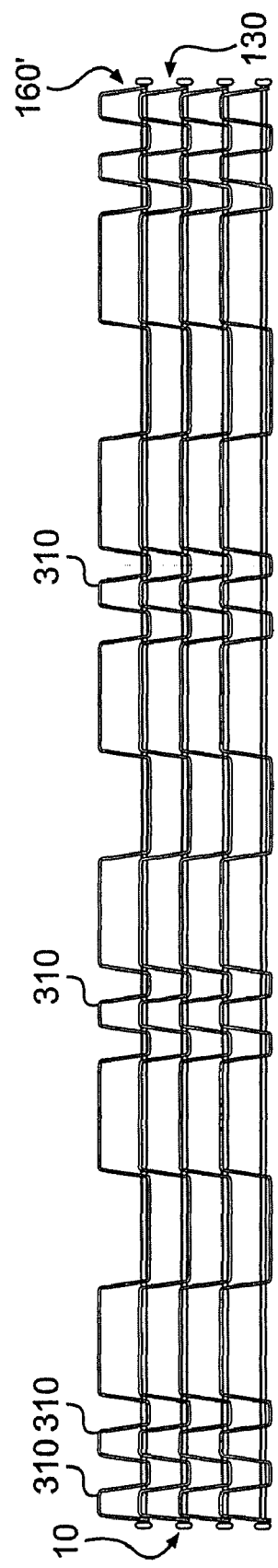
FIG. 3 is a top elevational view of a flat wire conveyor belt according to a second preferred embodiment of the present invention.

FIG. 3 discloses a further preferred embodiment in which picket 160' having multiple links 310 disposed on each edge 120, 130 so as to define tension bearing elements, and one or more links 310 disposed in one or more locations in the middle region of the picket. By providing one or more, preferably two, of the denser, more closely spaced links 310 on the edges and in the middle of the picket 160', the weight of the overall conveyor belt is not significantly increased and the denser links 310, when engaged by sprocket teeth, are able to assist in spreading the load over a greater width of the belt and reduce deflection by balancing the forces imparted by the adjacent teeth.

Figure 4:
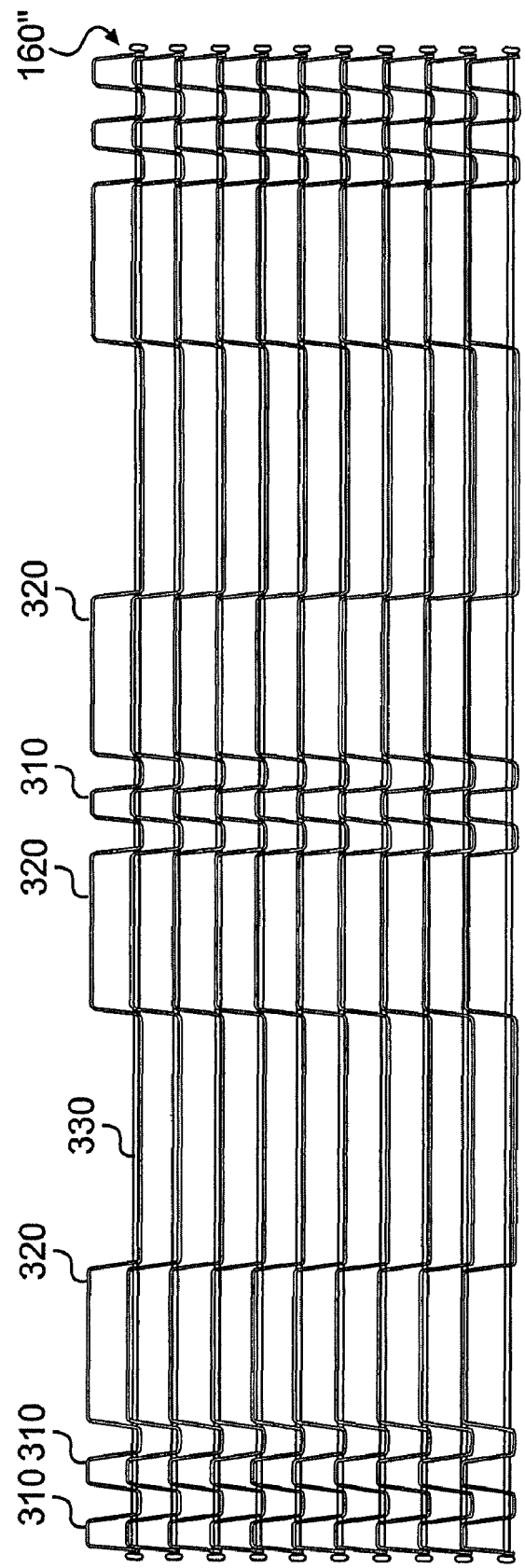
FIG. 4 is a top elevational view of a flat wire conveyor belt according to a third preferred embodiment of the present invention.

FIG. 4 illustrates yet a further preferred embodiment of the present invention, wherein picket 160" includes links 310 on each edge 120, 130 and the middle portion, and further includes links 330 having a greater width than both links 310 and 320. More particularly, the sections of the belt nearest to the sprocket locations, i.e., links 310, are narrower than the remaining sections of the belt in or to decrease deflection in the fatigue prone region of the belt.

Figure 5:
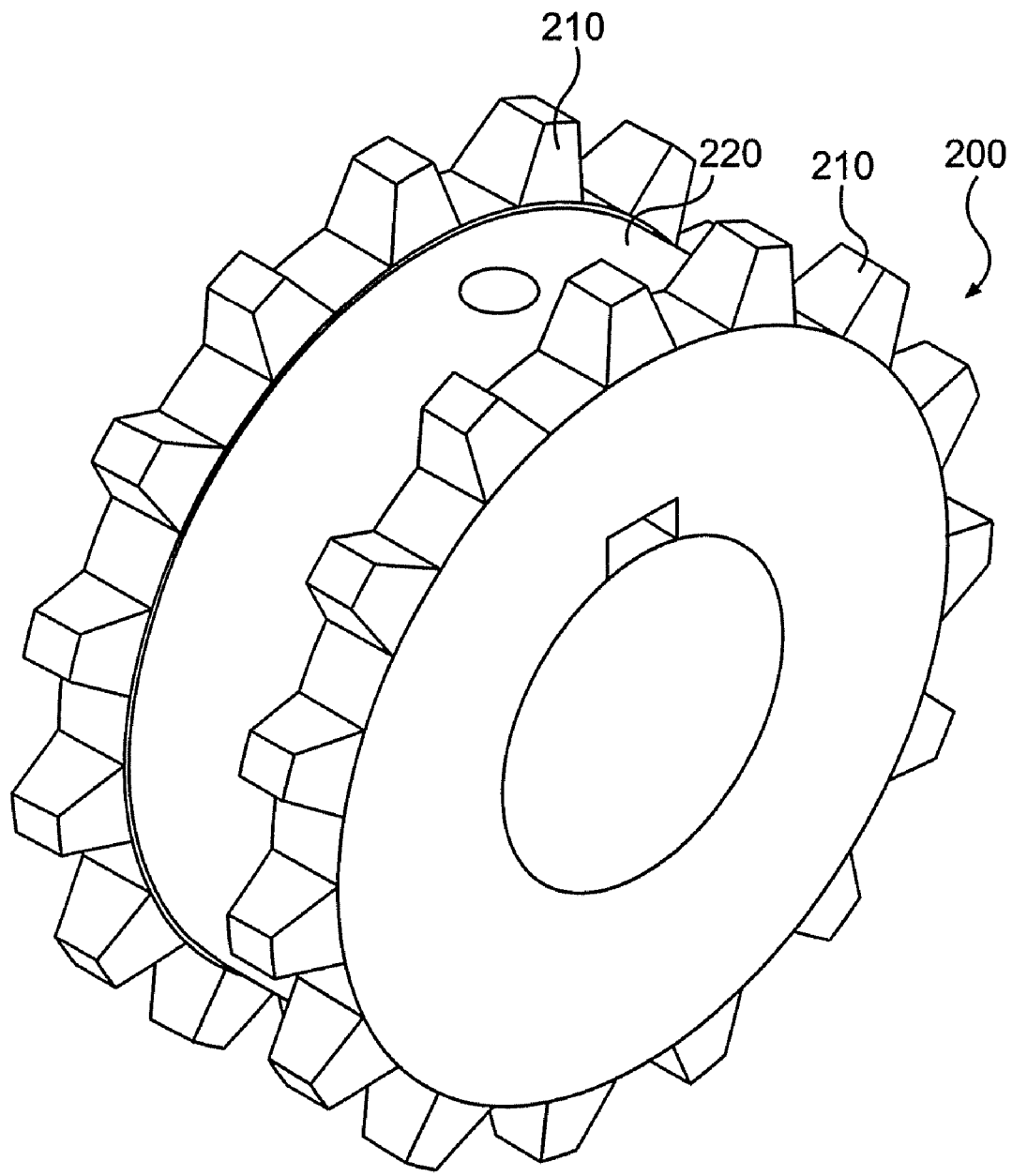
FIG. 5 is a perspective view of a dual tooth sprocket according to a preferred embodiment of the present invention.
Figure 6:
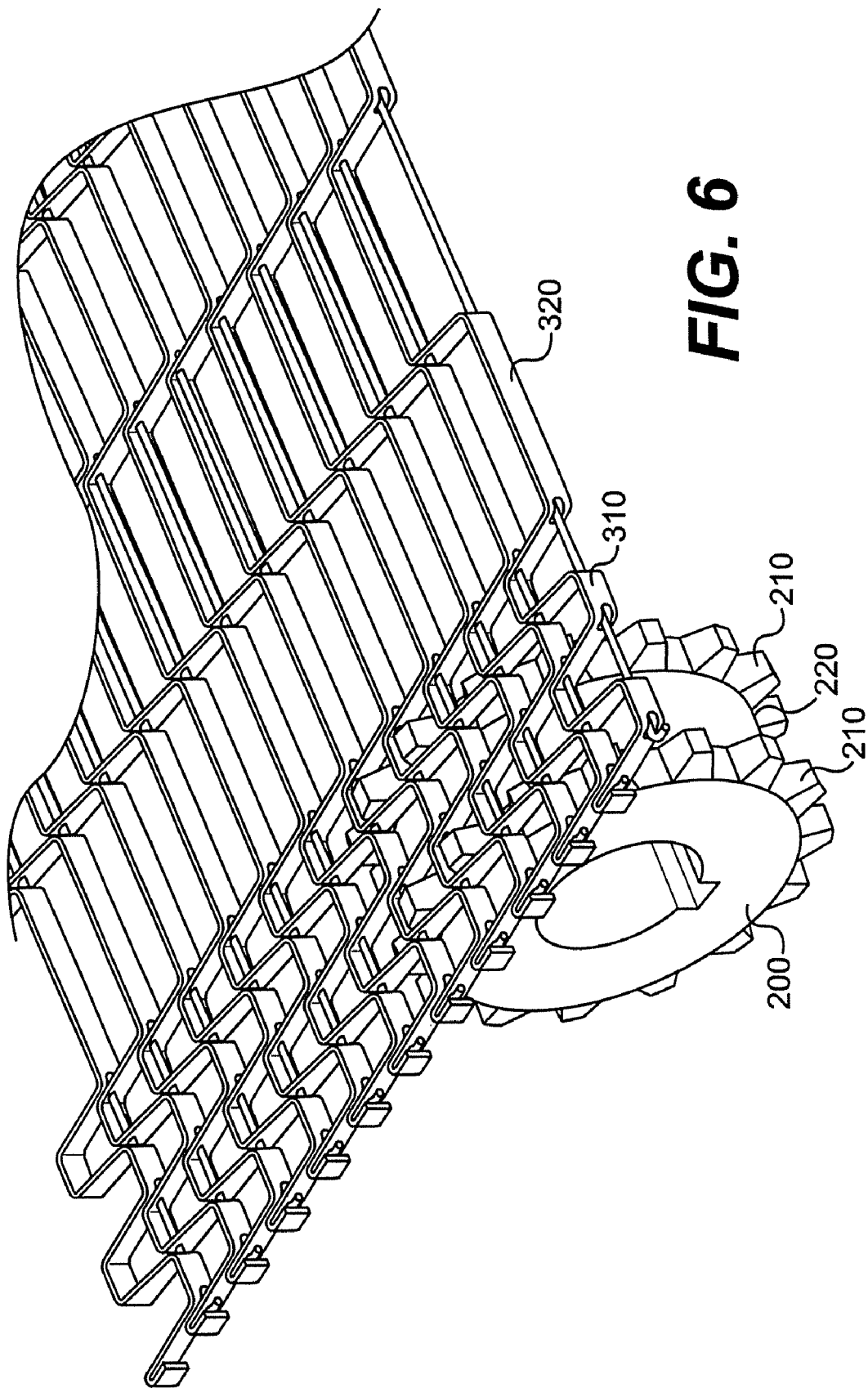
FIG. 6 is a perspective view of the dual tooth sprocket and a preferred embodiment of the flat wire conveyor belt of the present invention.

Referring to FIG. 5, a sprocket 200 in accordance with a preferred embodiment of the present invention is shown. Sprocket 200 is a dual tooth sprocket in that the each outer peripheral edge includes a row of sprocket teeth 210, with a smooth supporting surface 220 disposed therebetween. The ability to use a double tooth sprocket allows the belt to be more evenly loaded across the width and the narrow links 310 permit there to be less deflection at the drive engagement points. While a dual tooth sprocket is preferred, one skilled in the art will appreciate that two narrow sprockets with a single row of teeth could also be used to engage the narrow links 310 of the belt 100. As illustrated in FIG. 6, the sprocket teeth 210 engage the second and forth open areas (counting from left to right in the illustration) defined by links 310 of the conveyor belt 100, while the supporting surface 220 supports the open area disposed therebetween. The first open area defined by link 310 on each edge of the conveyor belt is preferably not used to engage sprocket teeth since the edges of the conveyor belt are already the most susceptible to damage and fatigue. In accordance with the present invention, the number and spacing of the sprocket engagement points can be varied depending upon the application and desired product loads.

The above-described embodiments illustrate preferred relationships between links within a picket configured for use with a dual tooth sprocket. Such descriptions are not limited to the illustrated lineal pitch, and can of course be used with any desired pitch. Similarly, the pickets and hence the conveyor belts can be manufactured to any preferred width depending upon the desired application. During the manufacturing process of the conveyor belt 100, each picket will have fixed openings in the picket, i.e., the even numbered openings, and variable openings, i.e., the odd numbered openings, that may be adjusted slightly in order to meet the customer demands. More particularly, the openings of all the links 310 are referred to as 1×1, yet the odd numbered links 310 may in actuality be 0.75×1 or 1.2×1 in order to render a finished conveyor belt having the desired width. Thus, for purposes of the present invention, links 310 are understood to be substantially similar is spacing even though manufacturing constraints may require slight variations from the specified width. This of course also applies to links 320 and 330.

While the present invention has been described with respect to a particular embodiment of the present invention, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the claims.

The invention claimed is:

1. A variable spaced flat wire conveyor belt system comprising:
   a plurality of spaced tractive rods;
   a plurality of rows of flat wire wickets transversely disposed with respect to a direction of travel and interconnecting said plurality of spaced tractive rods, each said wicket having a uniform thickness dimension throughout a width of the conveyor belt; each of said row of wickets defining a plurality of first links and a plurality of second links, each of said links having a longitudinal height and a transverse spacing; and
   at least one sprocket having a plurality of sprocket teeth, said at least one sprocket comprising inner and outer peripheral edges and a smooth supporting surface extending therebetween, each said peripheral edge having a single row of sprocket teeth therearound;
   wherein said plurality of first links have a first height and a first transverse spacing and said plurality of second links have a second height and a second transverse spacing, said first height being substantially equal to said second height and said first spacing being less than said second spacing, and
   wherein said conveyor belt includes opposing first and second outer edges and at least three of said plurality of first links are disposed on at least the first and second outer edges of the flat wire conveyor belt, said first links being dimensioned for receiving said single rows of sprocket teeth therewithin.

2. The conveyor belt system of claim 1 wherein said plurality of second links are disposed between said first links on the first and second outer edges so as reduce an overall weight of said conveyor belt and increase airflow.

3. The conveyor belt system of claim 1 wherein said at least one sprocket comprises a single sprocket.

4. The conveyor belt system of claim 1 wherein said at least one sprocket comprises at least two sprockets each defining a single row of sprocket teeth.

5. The conveyor belt system of claim 1 wherein said first plurality of links are also disposed in a middle region of each said wicket.

6. The conveyor belt system of claim 1 wherein said first spacing is defined by a 1×1 mesh and said second links is defined by a 3×1 mesh.

7. The conveyor belt system of claim 1 wherein said first spacing is defined by a mesh between ½×1 and 1×1.

8. The conveyor belt system of claim 1 wherein said second spacing is defined by a mesh between 3×1 and 4×1.

9. The conveyor belt system of claim 1 wherein each of said row of wickets further comprises a plurality of third links, each of said links having a longitudinal height and a transverse spacing; and wherein said plurality of third links have a third height and a third transverse spacing, said third height being substantially equal to said first and second heights and said third spacing being greater than said first and second spacings.

10. The conveyor belt system of claim 9 wherein said second links are immediately adjacent to said first links.

11. The conveyor belt system of claim 10 wherein said third links are disposed between adjacent said second links.

12. The conveyor belt system of claim 9 wherein said first plurality of links are also disposed in a middle region of each said wicket, said second links being immediately adjacent to said first links and said third links being disposed between adjacent said second links.

* * * * *